UNITED STATES PATENT OFFICE 2,099,086

LAMINATED GLASS

John S. Tinsley, New Brunswick, N. J., assignor to Hercules Powder Company, Wilmington, Del., a corporation of Delaware No Drawing. Application September 17, 1934, Serial No. 744,366

4 Claims. (Cl. 49—92)

This invention relates to a laminated glass, and more particularly to a laminated glass including an optically clear bonding plastic comprising essentially a hydrolized mixed ester of cellulose.

Laminated glass, as is well known, consists of two or more sheets of glass bonded together by a transparent, non-brittle plastic composition, which adheres to the sheets of glass and prevents the shattering of the composite product upon impact. This laminated glass is frequently referred to as "safety glass". The bonding plastic first used to any considerable extent in the art was a nitrocellulose plastic, such as, for example, Celluloid. Nitrocellulose plastics in general, however, possess the disadvantages of being highly inflammable and of discoloring easily upon continued exposure to sunlight. It has been proposed to use cellulose acetate plastics, which are free from these disadvantages, in the manufacture of safety glass. Cellulose acetate plastics are, however, objectionably sensitive to water, difficult to handle in the usual types of machinery for the production of plastics, and can seldom be obtained in perfectly transparent sheets.

Mixed esters of cellulose, such as, for example, cellulose acetobutyrate, cellulose acetopropionate, etc., possess properties which would be of advantage in bonding plastics for safety glass, but are unfortunately non-thermoplastic and brittle, and so totally unsuited for such use.

In my copending application Serial No. 737,407, filed July 28, 1934, I have described a procedure for the hydrolysis of mixed esters of cellulose, as cellulose acetobutyrate, which produces a product of marked thermoplasticity and high clarity in sheet or film form. This hydrolysis is carried out by heating the mixed ester after neutralization of the acid catalyst employed in its production and in the presence of an organic acid corresponding to one of the acid radicals of the mixed ester, all as is more fully described in the said application. In accordance with this invention I have found that a laminated glass of superior clarity, even after long use, strength at both low and high temperatures, and increased water resistance may be produced with the use of a bonding plastic comprising essentially these hydrolyzed mixed esters of cellulose, as for example, hydrolyzed cellulose acetobutyrate.

These bonding plastics may be prepared from a hydrolyzed mixed ester of cellulose, as hydrolyzed cellulose acetobutyrate, produced by the method described in my said copending application, or by any other method capable of giving a hydrolyzed material possessing high clarity in film or sheet form, and any suitable plasticizer. Generally all plasticizers capable of use with nitrocellulose or cellulose acetate may be used either alone or in admixture, such as, for example, camphor, diethyl phthalate, triphenyl phosphate, triethyl citrate, dimethyl phthalate, dibutyl phthalate, tricresyl phosphate, dibutyl tartrate, chlorinated diphenyl, etc. The plasticizer may be present within wide limits, for example, from about 10% to about 60% by weight of the plastic, altho desirably the plasticizer will constitute from about 15% to about 45% of the plastic.

Bonding plastics having the formulas set out below are illustrative of those suitable for use in accordance with this invention.

|  | Composition number | | | | |
|---|---|---|---|---|---|
|  | 1 | 2 | 3 | 4 | 5 |
| Hydrolyzed cellulose acetobutyrate, parts by weight | 20 | 20 | 20 | 20 | 20 |
| Camphor do | 6 |  |  |  | 6 |
| Diethyl phthalate do | 6 | 5 | 10 |  |  |
| Triphenyl phosphate do |  | 5 |  |  |  |
| Triethyl citrate do |  |  |  | 6 | 10 |

The plastics in accordance with this invention may be formed into sheets for use in the production of laminated glass by any of the methods customarily used with other cellulose ester plastics. Thus, for example, they may be cast from solution in a volatile solvent onto a moving wheel or belt, they may be extruded as a viscous plastic containing a small amount of volatile solvent, or they may be worked into sheets by apparatus used in the production of celluloid, a procedure hitherto utilizable only with nitrocellulose plastics. For example, a plastic sheet highly suitable for the production of laminated glass may be made by dissolving composition No. 1 shown in the above table in 68 parts of acetone, and casting two successive 0.015 inch layers of solution on a casting wheel.

Sheets of the plastic in accordance with this invention comprising a hydrolyzed mixed ester of cellulose and a plasticizer produced by any of the above described methods may be formed into the bonding layer of a laminated glass by any of the well known and customary procedures for the manufacture of laminated glass. The laminated glass so produced will be found to be superior to those hitherto produced in clarity, even after extended use, in strength and nonbrittleness at high and low temperatures, and in resistance to water.

The following table shows the properties of a bonding plastic produced in accordance with this invention in comparison with prior art products:

|  | Type of bonding plastic | | |
| --- | --- | --- | --- |
|  | Hydrolyzed cellulose acetobutyrate | Cellulose nitrate | Cellulose acetate |
| Water absorption of ester by weight | 4.0–5.5% | 3.5–4.0% | 7–10% |
| Decrease in flexibility of 0.020" sheets for drop in temperature from 25° C. to 0° C. | 33–60% | 20–45% | 80–95% |
| Minimum wave-length of light in A. U. transmitted by 0.020" plastic sheet | 2800–2900 | 3200 | 2750 |
| Melting point of ester | 200–210° C. | Explodes 188° C. | 225–240° C. |
| Distance above type at which solvent-polished ⅛" sheets can be held and letters distinguished | 1⅜–2⅛" | ½–1½" | ½–¾" |

It is to be understood that the examples and details hereinabove set forth are illustrative only, and that they in no way limit the invention as broadly described.

What I claim and desire to protect by Letters Patent is:

1. A laminated glass including a layer of substantially optically clear plastic comprising a hydrolyzed mixed ester of cellulose produced by heating the mixed ester, after its formation and after neutralization of the acid catalyst employed in its formation, in the presence of an acid corresponding to an acid radical of the mixed ester.

2. A laminated glass including a layer of substantially optically clear plastic comprising a hydrolyzed cellulose acetobutyrate produced by heating cellulose acetobutyrate, after its formation and after neutralization of the acid catalyst employed in its formation, in the presence of an acid corresponding to an acid radical thereof.

3. A laminated glass including a layer of substantially optically clear plastic comprising a plasticizer and a hydrolyzed mixed ester of cellulose produced by heating the mixed ester, after its formation and after neutralization of the acid catalyst employed in its formation, in the presence of an acid corresponding to an acid radical of the mixed ester.

4. A laminated glass including a layer of substantially optically clear plastic comprising a plasticizer and a hydrolyzed cellulose acetobutyrate produced by heating cellulose acetobutyrate, after its formation and after neutralization of the acid catalyst employed in its formation, in the presence of an acid corresponding to an acid radical thereof.

JOHN S. TINSLEY.